May 19, 1953  L. N. HAMPTON ET AL  2,639,149
FLEXIBLE CARD FEED
Filed Nov. 4, 1949  6 Sheets-Sheet 1

INVENTORS
L.N. HAMPTON
M. SALZER
BY
C. Mattice
ATTORNEY

INVENTORS
L.N. HAMPTON
M. SALZER
BY
C. Mattice
ATTORNEY

May 19, 1953  L. N. HAMPTON ET AL  2,639,149
FLEXIBLE CARD FEED
Filed Nov. 4, 1949  6 Sheets-Sheet 3

FIG. 3

INVENTORS L. N. HAMPTON
M. SALZER
BY
C. Mattice
ATTORNEY

INVENTORS L. N. HAMPTON
M. SALZER
BY C. Mattice
ATTORNEY

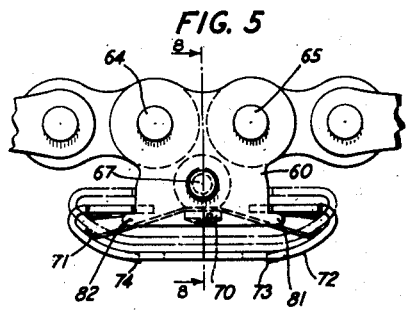

May 19, 1953
L. N. HAMPTON ET AL
2,639,149
FLEXIBLE CARD FEED
Filed Nov. 4, 1949
6 Sheets—Sheet 6
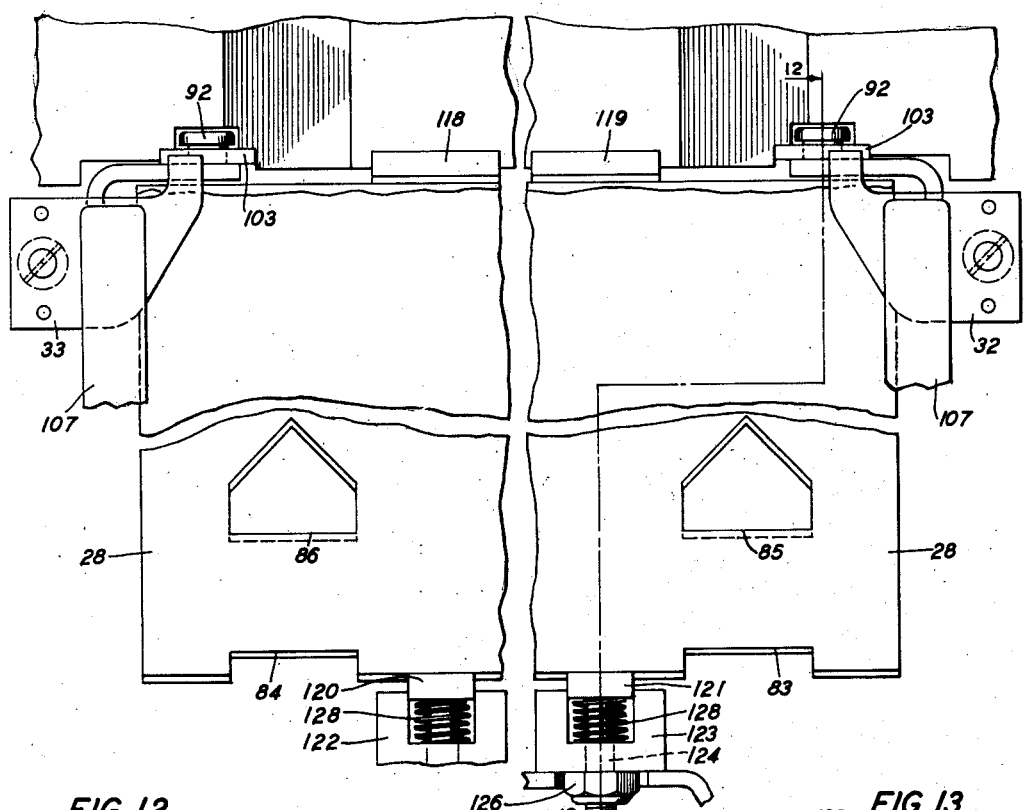
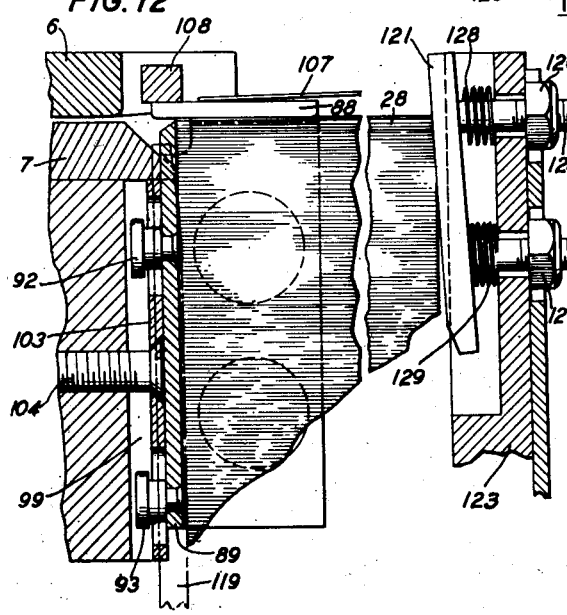
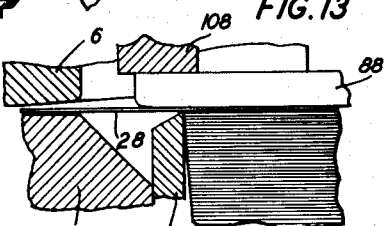
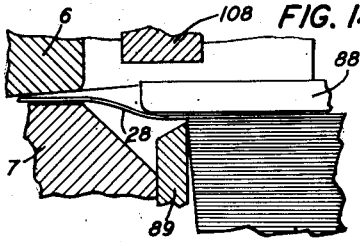
INVENTORS L. N. HAMPTON
M. SALZER
BY
C. Mathie
ATTORNEY Patented May 19, 1953

2,639,149

UNITED STATES PATENT OFFICE 2,639,149

FLEXIBLE CARD FEED

Leon N. Hampton, Pleasantville, and Martin Salzer, Great Neck, N. Y., assignors to Bell Telephone Laboratories, Incorporated, New York, N. Y., a corporation of New York Application November 4, 1949, Serial No. 125,622

16 Claims. (Cl. 271—34)

This invention relates to card perforating machines and has for its object to facilitate the handling of the cards in such machines.

In automatic telephone systems it has long been customary, in the case where a trouble arises, to set up an indication, on a bank of lamps, of the nature of the trouble and of the equipment involved in the trouble. Various suggestions have been made for the transfer of this indication to a punched or printed record, but these suggested arrangements have proved somewhat slow for satisfactory results.

Recently a card perforator has been designed for making trouble records directly from the automatic telephone equipment but, due to the large amount of information to be recorded and the desire to make the record as quickly as possible, the card employed is exceptionally long and is therefore subject to distortion.

In accordance with the present invention, flexible card feeding means is provided which is capable of handling warped cards, including a floating throat and a spring mounted card hook.

More specifically, the floating throat is so mounted adjacent the unused card receptacle that it may move freely in a vertical direction and is provided with an arm resting on the top card in the receptacle, against which it is pressed by a spring. The throat is so formed that only one card can pass through it at a time. Two such throats are provided to function near each end of the cards. Means is provided for preventing contact between the throat and all but a few cards near the top of the card receptacle.

The card hook comprises a hook member having the form of a flattened C from which two prongs are bent out, facing one another and spaced to engage the edges of preformed configurations in the card including a perforation and a notch. The edge of one prong engages the edge of the notch and acts to advance the card through the perforator. The edge of the other prong engages the edge of the perforation to back the card, should this be necessary, as a result of overshooting the intended perforating position. This hook member is maintained in yielding relationship to a mounting carried by a chain drive by means of a bifurcated spring member so that the hook member may move both vertically and angularly with respect to the mounting and thereby conform with the conformation of the top card of the stack, thus ensuring reliable engagement despite card distortion. The form of the card configuration is such that no pressure may be exerted between the card stack and the card hook except through the card engaged by the card hook.

These and other features of the invention will be more clearly understood from a consideration of the following description read in connection with the drawings in which:

Fig. 3 shows an end view, partly in cross-section;

Fig. 5 shows an enlarged side view of the card hook illustrating its vertical flexibility;

Fig. 6 shows the card hook illustrating its longitudinal angular flexibility;

Fig. 7 is a top plan view of the card hook;

Fig. 8 is a section on the line 8—8 of Fig. 5, illustrating the lateral angular flexibility of the card hook;

Fig. 9 is an exploded view of the elements of the card hook;

Fig. 10 is an exploded view of the flexible throat and its mounting;

Fig. 11 shows a broken top view of the cards in the card receptacle in relation to the floating throats;

Fig. 12 shows a cross-section on the line 12—12 of Fig. 11;

Fig. 13 shows the normal passage of a card through the floating throat to the die chamber; and Fig. 14 shows the passage of a card through the throat to the die chamber when the card stack is lowered.

Figure 1:
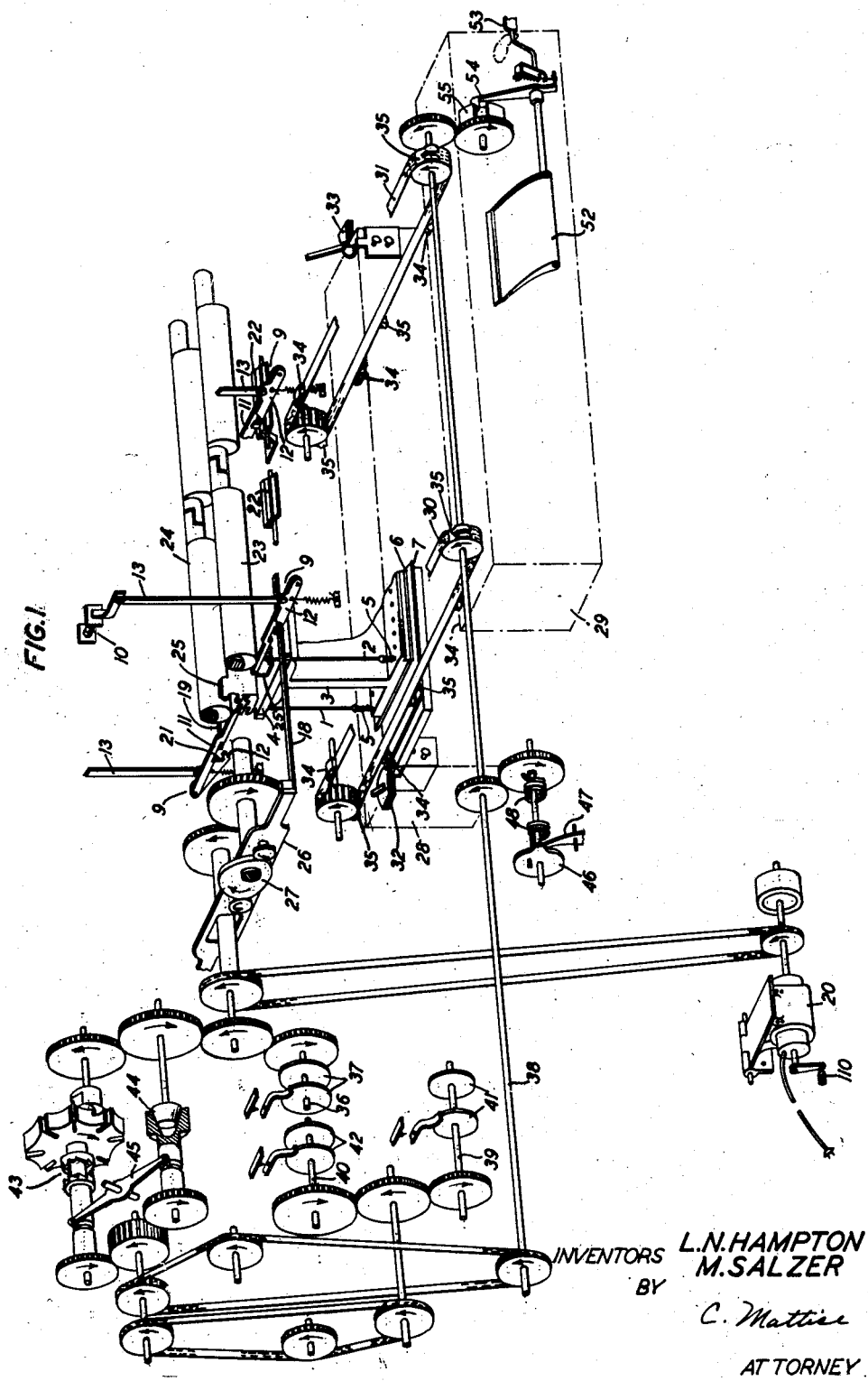
Fig. 1 shows in diagrammatic form the elements of the card perforator.

A general description of the card perforating machine will first be given, referring to Figs. 1, 2 and 3 in which corresponding elements in the three figures bear the same reference numerals.

The card perforator comprises two rows of perforating punches 1 and 2, there being sixty-two punches in each row, supported on the two sides of a modified I beam 3 and passing through aligned holes in a guide plate 4 and in the base of the I beam. The punches are held in their clearance retracted position by means of springs 5. When depressed, they pass through aligned holes in the stripper plate 6 and the die plate 7.

The punches are selected for operation by means of a corresponding set of interposer elements 9, each controlled by an individual interposer magnet 10. The interposer element includes an interposer bar 11 and a latch 12, connected to the armature of the controlling magnet by a link 13. Since the magnets 10 are wider than the desirable space between the punches, they are mounted with their centers staggered on four sets of mounting plates 14, 15, 16 and 17, as best disclosed in Fig. 2, and the links 13 are of four lengths to accord with this arrangement. A pair of drive, or shuttle bars 18 and 19 are continuously reciprocated when the motor 20 is operating, moving freely in recesses 21 in the interposer bars 11. When an interposer magnet 10 is energized it lifts the corresponding latch 12, by means of the link 13, latching the interposer bar to the associated drive bar so that the interposer bar may be moved into operative position. A latch stop 22, shown in fragmentary form in Fig. 1 and in section in Fig. 3, extends past all of the latches and is so located and shaped that the forward ends of the latches normally lie in a groove in the latch stop, whereby any accidental movement of an interposer and the false operation of a punch is positively prevented. In addition, whenever a latch 12 is lifted by the corresponding interposer magnet and the interposer element 9 starts to move forward, the latch stop 22 holds the lifted and inwardly displaced latch in place independent of the interposer magnet and insures the correct operation of the corresponding punch even where the operating time of the interposer magnet is limited. The latch stop being yieldably mounted also acts to protect the mechanism against mechanical damage in the event of faulty timing of interposer magnet operation.

The actual punching operation is brought about by means of eccentric shafts 23 and 24, which are effective, when an interposer bar has been moved into its forward position, to drive the corresponding punch through a card located between the stripper plate 6 and die plate 7. As the eccentric shafts rotate out of punching position they act on retractors 25, which positively lift the depressed punches back to their normal position. In Fig. 1, the retractor associated with shaft 23 has been shown broken to give a clearer view of the retractor associated with shaft 24. The drive bars 18 and 19 are operated by a shuttle plate 26 which is in turn reciprocated by a cam 27 mounted on the axle of the shaft 23, thereby making one reciprocal cycle for each revolution of the rollers. The cam 27 is arranged to uniformly accelerate and decelerate the shuttle bars between their inner and outer positions and to allow for a dwell period in each of these positions.

The unused cards are stacked in the unused card bin 28 and are fed through the perforator to the used card bin 29 by means of two chain belts 30 and 31, the cards being fed one at a time between the die and stripper plates by means of the floating throats 32 and 33. Mounted on each chain belt are four card hooks 34 as well as four sets of contact springs 35, the latter being used to sound an alarm if the card fails to feed properly. The details of the floating throats and card hooks will be described hereinafter.

The perforator is driven by the motor 20, acting through belts and sets of gears shown at the left of Fig. 1. These gears are located above the motor in the space at the left of the recorder as shown in Fig. 2. As indicated in Fig. 1, the motor 20 is belt-coupled to the eccentric shafts 23 and 24 and to shaft 38 which carries the set of apparatus control cams 37 so that the shafts 23 and 24 and cams 37 are in continuous rotation while the motor 20 is operating. It acts on the card drive shaft 38 and on shafts 39 and 40, carrying sets of cams 41 and 42 through the medium of one or the other of two clutches 43 and 44. Clutch 43 connects an intermittent drive mechanism in the nature of a Geneva movement to the card drive shaft 38, while clutch 44 provides a continuous drive for the card drive shaft. These clutches are employed selectively by the movement of a pivoted arm 45, under the control of solenoids (not shown) which are in turn controlled by certain of the cams 37 and 42 to bring about the operation of the clutches at the proper angular positions of the drive shafts. As is well known, the use of the Geneva movement drive imparts to the card a dwell for a punching operation and a rapid advance to the next punching position. The shaft of the motor is arranged to receive a handle, shown at 110 in Fig. 1 by which the belts and gears may be moved if it is necessary to make adjustments.

Cam 46 and latch 47 serve to stop the card drive shaft 38 in the proper position at the end of one cycle of operations, spiral spring 48 cushioning the effect of latch 47. Cams 37 make one revolution for each revolution of the shafts 23 and 24 and serve to synchronize the operation of the clutches 43 and 44 with the position of the rollers and of the punching apparatus. Cams 42 make one revolution during one cycle of operation of the perforator, while cams 41 make three revolutions per cycle. Cams 42 control the operating circuits of the perforator itself, while cams 41 control the circuits by which the interposer magnets are operated. The circuits by which the operation of the perforator is controlled are disclosed in Patent 2,508,052 to O. H. Williford, May 16, 1950.

When the perforator is idle, a card is in position for receiving the first punching operation. Seizure of the perforator starts the motor if it is not running. Cams 37 control the first punching operation and the operation of the intermittent clutch 43. Eight additional punching operations are performed under the control of the intermittent clutch 43 and cams 41. At the end of the ninth punching operation, cams 42 cause the transfer from the intermittent clutch 43 to the continuous clutch 44, which feeds the punched card to the used card bin 29 and an unused card to the operative position, and controls the stopping of the card and cam drive in their normal positions.

Figure 2:
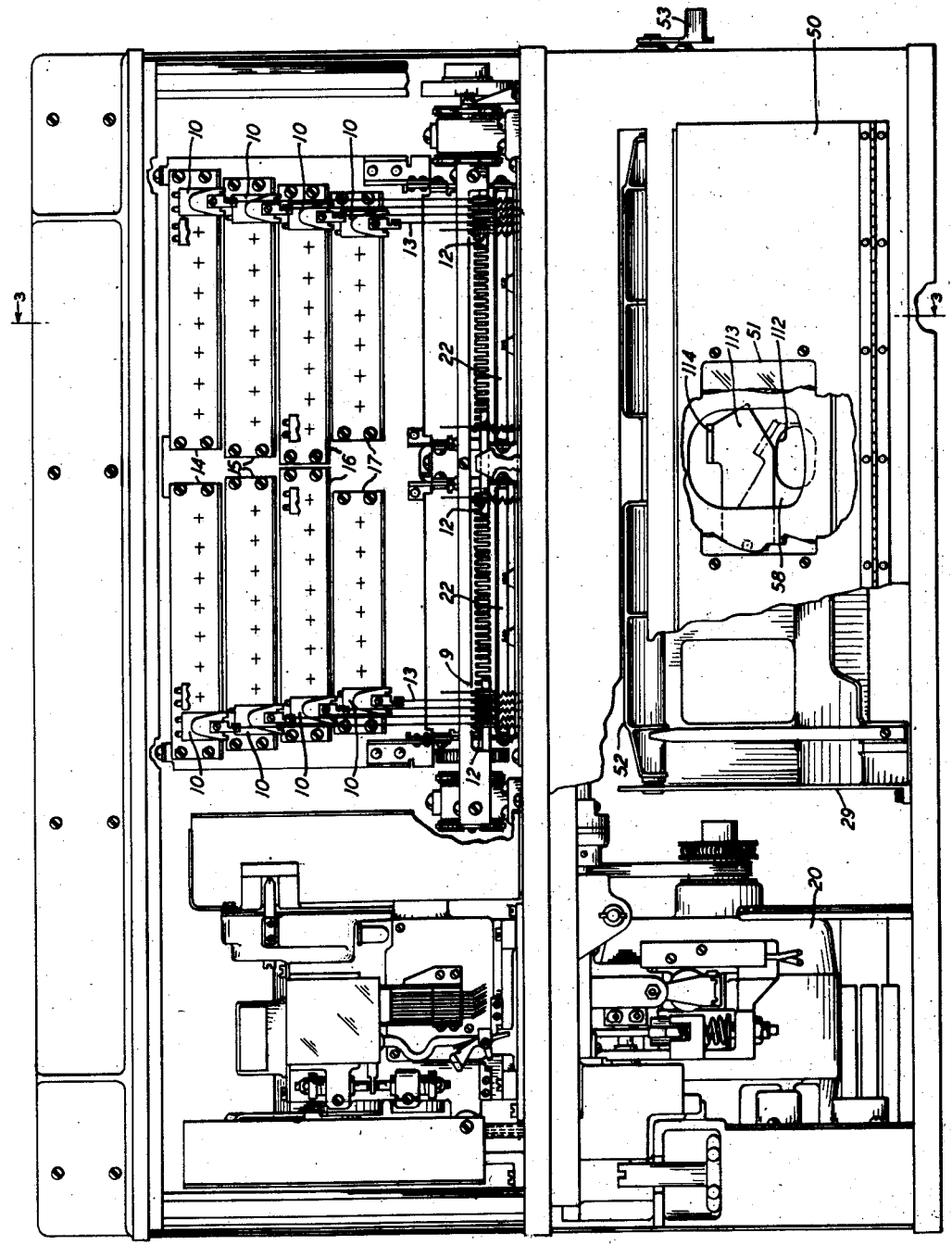
Fig. 2 shows a front view of the card perforator as assembled.

As shown in Fig. 2, the used card bin 29 is provided with a hinged door 50 by which the used cards may be removed. This door also has a glass window 51 so that the number of cards in the bin may be readily observed. However, there may be times when the attendant wishes to inspect the trouble records immediately after they are punched and for this purpose a card selector 52 is provided, controlled by a handle 53 and a cam follower 54. The card selector is normally in its upper position so that the cards are fed under it to the used card bin. When the attendant wishes to inspect the cards he moves the handle 53 back, but the cam follower 54 which engages a specially formed cam 55 rotating with the card drive, prevents the corresponding movement of the card selector until the end of a card cycle to prevent damaging a card which may be on the way to the used card bin. In Fig. 3 the card selector 52 is shown in its lowered position.

The unused card bin 28 also has a hinged cover 53. The unused cards are placed on a platform 54, which may be latched in its lowermost position by latch 109 when the cover is open for the insertion of cards. Pressure is exerted in the upward direction on the platform by means of a pair of elevator arms, one of which is shown at 115 in Fig. 3. These arms are drawn together by means of spring 116 and transmit their pressure to the platform by means of rollers such as roller 117. When the cover 53 is closed a stud 56 carried by the cover 53 engages latch 109 to release the platform to the control of the elevators.

A chaff bin 57 is mounted under the holes in the die plate 7, and is provided with a window 58 so that the contents may be observed through openings in the back of the used card bin 29. For convenience in removing chaff from the bin, the window 58 has an opening 112 therein. A pivoted transparent cover 113 normally closes this opening. This cover is formed with a flange 114 by which it may be lifted to permit the insertion of a vacuum tool as indicated in Fig. 3.

Figure 4:
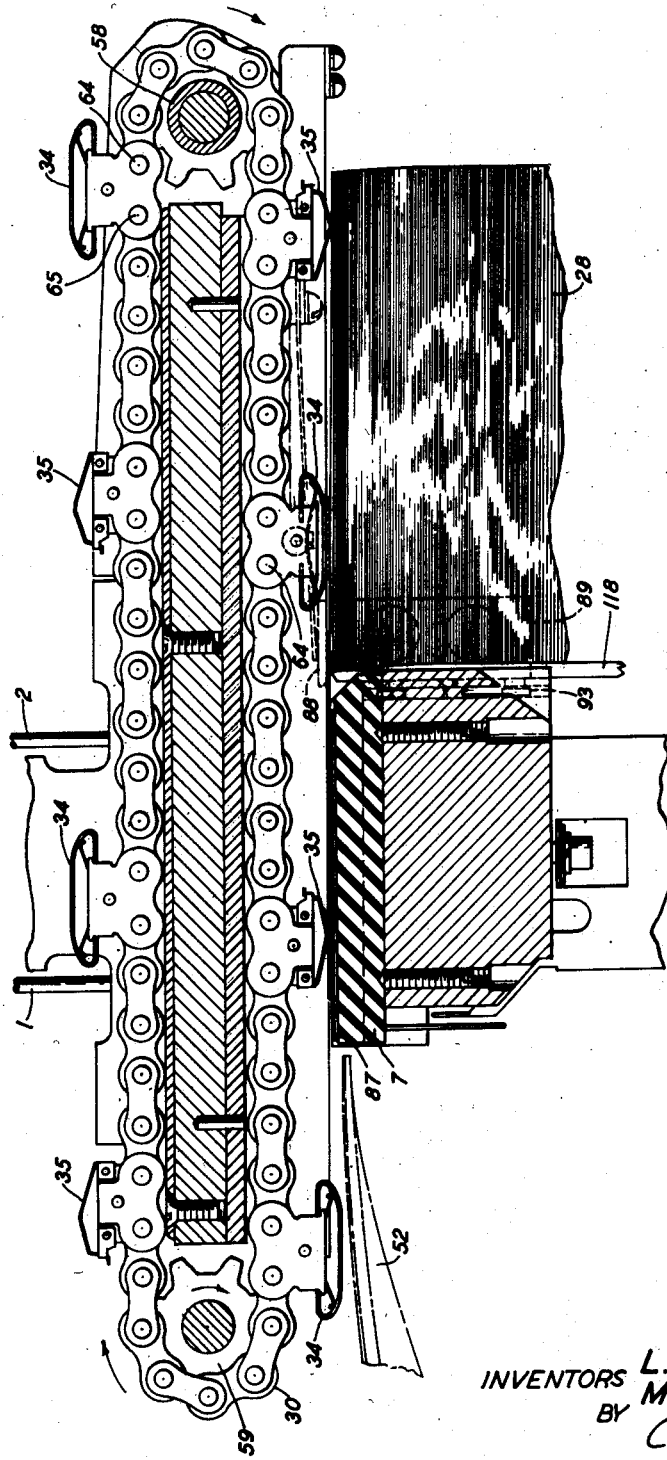
Fig. 4 shows the card feeding mechanism.

For details of the card hooks, reference will now be made to Figs. 4 to 9. As shown in Fig. 4, the card hooks 34 and contact springs 35 are carried on links of a continuous rollerless type chain which is driven by two spur wheels 58 and 59. The card hook link comprises a pair of side pieces 60 and 61 having holes 62 and 63 which pass over the chain pins 64 and 65. A third hole 66 passes over the reduced end of the hook link spacer 67 and is held in position thereon by a split ring 68 which is forced into a groove 69 on the end of the spacer 67. Fastened to the bottom of the spacer 67 by a screw 70 is a bifurcated spring member 71. Since the center of the spring member is fixed, the two ends may act independently.

The card hook itself is a C-shaped strip of metal 72 having two rectangular prongs 73 and 74 struck out of the bottom surface and bent out so that they project from the surface facing toward one another a distance somewhat less than the thickness of one card. In forming the prongs, additional metal is removed to provide openings 75 and 76 to discharge any dust, dirt or lint which otherwise might accumulate. The ends of the hook have the corners cut away, forming projections 77 and 78 and leaving shoulders such as 79 and 80.

Each link side piece such as 69 has two ears 81 and 82 formed adjacent the lower edge. In assembling the card hook link, one side piece, for example, side piece 61 is mounted on the chain pins 64 and 65 and the spacer 67. The spring 71 is then attached, with the bifurcated end toward the leading end of the mounting, and the hook element 72 is slipped over the spring, until one edge of each projection 77 and 78 nearly rests against side piece 61, the ears on that side piece extending under the shoulders on that side of the hook element 72. The second side piece 60 is then arranged on the chain pins and spacer, the spacer being of such size that side piece 60 nearly rests against the projections 77 and 78 and the ears 81 and 82 extend under shoulders 79 and 80. With washer 68 in place the card hook element 72 is held in place with the ends of spring 71 engaging the inner surface of the element 72. The relative positions of projections 77 and 78, shoulders 79 and 80 and ears 81 and 82 may be seen in Fig. 7.

As illustrated in Fig. 5, if the height of the card stack in the unused card bin varies, the flexibility of spring 71 permits the card hook to move in a vertical direction to accommodate itself thereto. Similarly, as shown in Fig. 6, if the card is warped in the direction of travel of the card hook, the hook may move in a correspnding angular direction, while as shown in Fig. 8, if the card is warped laterally, the hook may also yield in the horizontal direction.

As shown in Fig. 11, the cards are preformed with a pair of rectangular notches 83 and 84 in the rear edge and at a distance inside the card with a pair of perforations 85 and 86 aligned with the notches, each having a rectangular base and an angular top. The purpose of the rectangular notch is to prevent pressure from the card stack acting on the card hook as the card leaves the stack and possibly being disengaged thereby. The notch is of such depth that the card hook will effectively clear the stack before the rear edge of the card moves off the stack. The purpose of the angular top of the perforation is to prevent the front edge of the perforation of a warped under card catching against the rear edge of the perforation in the moving card to interfere with the card feeding. The distance between a notch and a perforation is slightly less than the distance between the edges of prongs 73 and 74 on a card hook. The two card feeding chains are aligned with these notches and perforations as the cards rest in the unused card bin 28. As a card hook is moved along by its chain the leading prong rides over the space between the recess and the perforation, but as soon as it reaches the perforation drops into it, the following prong at the same time engaging the edge of the card at the notch and moving the card with it. The leading prong acts as a back stop and also serves to move the card if there is an overthrow as the card is coming to rest.

As shown in Fig. 4, under normal operation the contact springs 35 ride on the card, but if, for any reason, the card hook fails to engage a card, the springs 35 make contact with metallic contact strip 87 which is so arranged that an alarm will result.

The floating throat is shown in detail in Figs. 10 to 13 and is also indicated in Fig. 4. As indicated in Fig. 11, two such throats are provided, mounted in a position near the ends of the card receptacle. The throat itself is formed of two plates 88 and 89, plate 88 carrying a lip 90 and plate 89 carrying a beveled lip 91. When the throat is assembled, these two lips are arranged with a definite space between and with the lip surfaces converging.

Plate 89 is bent at a right angle to conform to the shape of the card receptacle and carries, on one wing, the mounting studs 92 and 93 as well as lip 91 and, on the other wing, which is perforated for lightness, a lateral arm 94. Plate 88 at one end conforms in shape to the arm 94 to which it is attached by screw 95, being held from rotary movement by dowels 96 and 97 and separated from arm 94 by a shim 98, the thickness of which determines the opening in the throat. This opening is set at slightly more than the thickness of one card but less than the thickness of two cards. The other end of plate 88 extends over the angle in plate 89 and, with the throat in position, rests on the top card in the card receptacle.

For the purpose of mounting the throat on the frame of the perforator, a slot 99 is formed in the base member 100. Shoulders 101 and 102 at the sides of the slot 99 receive a plate 103 which is fastened to base member 100 by screw 104. In plate 103 are guide slots 105 and 106, slot 105 being enlarged at one end to receive the head of stud 93. After the studs have been inserted in the guide slots the throat may move freely for a limited distance in a vertical direction.

In order to maintain contact between plate 88 and the top card, pressure is exerted on plate 88 by means of a spring 107 which is suitably mounted for the purpose. To prevent pressure by the cards against the throat which might restrict its action two guide strips 118 and 119 are mounted on the inner side of the unused card bin as shown in Fig. 11. As indicated in Fig. 12, these strips hold the larger part of the cards out of contact with the back surface of the throat 89, but permit the top few cards to advance into such contact.

To insure such advance and to place the top card in position to be moved into the throats, pressure pads 120 and 121 are mounted on the rear guide strips 122 and 123, which are in turn mounted on the rear door of the unused card bin. The pressure which these pads exert and the angle at which they engage the top of the stack is adjustable. As shown in Fig. 12, pad 121 is held to the guide strip 123 by means of two bolts 124 and 125, which pass through springs 128 and 129 and through enlarged holes in the guide strip 123, and which are held in place by self-locking nuts 126 and 127. As shown in Fig. 12, excessive movement of the throat is prevented by a stop bar 108. As shown in Figs. 13 and 14, with the throat in its uppermost position, the card feeds directly into the space between the stripper plate 6 and the die plate 7. If the card stack and the throat become depressed, a beveled surface on the edge of the die plate directs the card into the proper position.

What is claimed is:

1. In a card perforator, a card receptacle, a stack of cards in said receptacle, each card having preformed configurations therein, adjacent configurations having parallelly disposed edges to form an engageable strap, and means for feeding cards one at a time from said stack regardless of possible warped conditions of said cards comprising floating throats and flexible card hooks, each of said throats having an opening greater than the thickness of one card and less than the thickness of two cards, means for determining the position of said throats by the position of the top card in said stack, a flexible drive medium comprising an endless chain for moving said card hooks only in one direction over said stack of cards, means for mounting said card hooks on predetermined links of said chain, prongs projecting from said card hooks a distance less than the thickness of one card and arranged to engage said strap, and spring means in said mounting for pressing said prongs against the top card in said stack until said prongs engage said strap.

2. In a card perforator, a card receptacle, a stack of cards in said receptacle, each card having preformed configurations therein, adjacent configurations having parallelly disposed edges to form an engageable strap, and means for feeding cards one at a time from said stack regardless of possible warped conditions of said cards comprising floating throats and flexible card hooks, each of said throats having an opening greater than the thickness of one card and less than the thickness of two cards, an arm carried by each of said throats resting on the top card of said stack to determine the position of said throats by the position of the top card in said stack, a flexible drive medium comprising an endless chain for moving said card hooks only in one direction over said stack of cards, means for mounting said card hooks on predetermined links of said chain, prongs projecting from said card hooks a distance less than the thickness of one card and arranged to engage said strap, and spring means in said mounting yieldable both vertically and angularly for pressing said prongs against the top card in said stack until said prongs engage said strap.

3. In a card perforator, a card receptacle, a stack of cards in said receptacle, each card having preformed configurations therein, adjacent configurations having parallelly disposed edges to form an engageable strap, and means for feeding cards from said stack regardless of possible warped conditions of said cards, comprising floating throats and flexible card hooks, slotted means for mounting said throats adjacent said card receptacle to permit vertical movement of said throat, an arm carried by each of said throats resting on the top card of said stack to determine the position of said throats by the position of the top card in said stack, a flexible drive medium comprising an endless chain for moving said card hooks only in one direction over said stack of cards, means for mounting said card hooks on predetermined links of said chain, prongs projecting from said card hooks arranged to engage said strap, and spring means in said mounting for pressing said prongs against the top card in said stack until said prongs engage said strap.

4. In a card perforator, a card receptacle, a stack of cards in said receptacle, each card having preformed configurations therein, adjacent configurations having parallelly disposed edges to form an engageable strap, and means for feeding cards one at a time from said stack regardless of possible warped conditions of said cards, comprising floating throats and flexible card hooks, each of said throats having an opening greater than the thickness of one card and less than the thickness of two cards, slotted means for mounting said throats adjacent said card receptacle to permit vertical movement of said throats, an arm carried by each of said throats resting on the top card of said stack to determine the position of said throats by the position of the top card in said stack, a drive medium comprising an endless chain for moving said card hooks only in one direction over said stack of cards, means for mounting said card hooks on predetermined links of said chain, prongs projecting from said card hooks a distance less than the thickness of one card and arranged to engage said strap, and bifurcated spring means in said mounting yieldable both vertically and angularly for pressing said prongs against the top card in said stack until said prongs engage said strap.

5. In a card perforator, a card receptacle, a stack of cards in said receptacle, each card having preformed configurations therein, adjacent configurations having parallelly disposed edges to form an engageable strap, and means for feeding cards from said stack regardless of possible warped conditions of said cards comprising floating throats and flexible card hooks, means for determining the position of said throats by the position of the top card in said stack, drive means comprising an endless chain for moving said card hooks over said stack of cards in a direction parallel to the surfaces thereof, means for mounting said card hooks on predetermined links of said chain, prongs projecting from said card hooks arranged to engage said strap, spring means in said mounting for pressing said prongs against the top card in said stack until said prongs engage said strap, and means for exerting upward pressure on said stack, the shape of said card configurations permitting said pressure to act on said card hooks only through the medium of said top card.

6. In a card perforator, a card receptacle, a stack of cards in said receptacle, each card having preformed configurations therein, adjacent configurations having parallelly disposed edges to form an engageable strap, and means for feeding cards from said stack regardless of possible warped conditions of said cards comprising floating throats and flexible card hooks, means for determining the position of said throats by the position of the top card in said stack, drive means comprising an endless chain for moving said card hooks over said stack of cards in a direction parallel to the surfaces thereof, means for mounting said card hooks on predetermined links of said chain, prongs projecting from said card hooks arranged to engage said strap, spring means in said mounting for pressing said prongs against the top card in said stack until said prongs engage said strap, and means for exerting upward pressure on said stack, the shape of said card configurations preventing said pressure transmitted through said stack from acting on said card hooks to disengage said card hooks from said top card.

7. In a card perforator, a card receptacle, a stack of cards in said receptacle, each card having preformed configurations therein, adjacent configurations having parallelly disposed edges to form an engageable strap, and means for feeding cards one at a time from said stack regardless of possible warped conditions of said cards, comprising floating throats and flexible card hooks, each of said throats having an opening greater than the thickness of one card and less than the thickness of two cards, slotted means for mounting said throats adjacent said card receptacle to permit vertical movement of said throats, an arm carried by each of said throats resting on the top card of said stack to determine the position of said throats by the position of the top card in said stack, a flexible drive medium comprising an endless chain for moving said card hooks over said stack of cards in a direction parallel to the surface thereof, means for mounting said card hooks on predetermined links of said chain, prongs projecting from said card hooks a distance less than the thickness of one card and arranged to engage said strap, bifurcated spring means in said mounting yieldable both vertically and angularly for pressing said prongs against the top card in said stack until said prongs engage said strap, and means for exerting upward pressure on said stack, the shape of said card configurations permitting said pressure to act on said card hooks only through the medium of said top card.

8. In a card perforator, a card receptacle, a stack of cards in said receptacle, each card having preformed configurations therein, adjacent configurations having parallelly disposed edges to form an engageable strap, and means for feeding cards one at a time from said stack regardless of possible warped conditions of said cards, comprising floating throats and flexible card hooks, each of said throats having an opening greater than the thickness of one card and less than the thickness of two cards, slotted means for mounting said throats adjacent said card receptacle to permit vertical movement of said throats, an arm carried by each of said throats resting on the top card of said stack to determine the position of said throats by the position of the top card in said stack, a flexible drive medium comprising an endless chain for moving said card hooks only in one direction over said stack of cards, means for mounting said card hooks on predetermined links of said chain, prongs projecting from said card hooks a distance less than the thickness of one card and arranged to engage said strap, bifurcated spring means in said mounting yieldable both vertically and angularly for pressing said prongs against the top card in said stack until said prongs engage said strap, and means for exerting upward pressure on said stack, the shape of said card configuration preventing said pressure transmitted through said stack from acting on said card hooks to disengage said card hooks from said top card.

9. In a card perforator, a card receptacle, a stack of cards in said receptacle, each card having preformed configurations therein, adjacent configurations having parallelly disposed edges to form an engageable strap, and means for feeding cards from said stack regardless of possible warped conditions of said cards comprising floating throats and flexible card hooks, means for determining the position of said throats by the position of the top card in said stack, means for holding a large part of said card stack out of contact with said throats, drive means comprising an endless chain for moving said card hooks in a direction parallel to the surfaces thereof, means for mounting said card hooks on predetermined links of said chain, prongs projecting from said card hooks arranged to engage said strap, and spring means in said mounting for pressing said prongs against the top card in said stack until said prongs engage said strap.

10. In a card perforator, a card receptacle, a stack of cards in said receptacle, each card having preformed configurations therein, adjacent configurations having parallelly disposed edges to form an engageable strap, and means for feeding cards from said stack regardless of possible warped conditions of said cards comprising floating throats and flexible card hooks, means for determining the position of said throats by the position of the top card in said stack, means for holding a large part of said card stack out of contact with said throats, means for advancing a plurality of cards near the top of said stack into contact with said throats, drive means comprising an endless chain for moving said cards hooks over said stack of cards in a direction parallel to the surfaces thereof, means for mounting said card hooks on predetermined links of said chain, prongs projecting from said card hooks arranged to engage said strap, and spring means in said mounting for pressing said prongs against the top card in said stack until said prongs engage said strap.

11. In a card perforator, a card receptacle, a stack of cards in said receptacle, each card having preformed configurations therein, adjacent configurations having parallelly disposed edges to form an engageable strap, and means for feeding cards one at a time from said stack regardless of possible warped conditions of said cards, comprising floating throats and flexible card hooks, each of said throats having an opening greater than the thickness of one card and less than the thickness of two cards, slotted means for mounting said throats adjacent said card receptacle to permit vertical movement of said throats, an arm carried by each of said throats resting on the top card of said stack to determine the position of said throats by the position of the top card in said stack, means for holding a large part of said card stack out of contact with said throats, a flexible drive medium comprising an endless chain for moving said card hooks over said stack of cards in a direction parallel to the surface thereof, means for mounting said card hooks on predetermined links of said chain, prongs projecting from said card hooks a distance less than the thickness of one card and arranged to engage said strap, and bifurcated spring means in said mounting yieldable both vertically and angularly for pressing said prongs against the top card in said stack until said prongs engage said strap.

12. In a card perforator, a card receptacle, a stack of cards in said receptacle, each card having preformed configurations therein, adjacent configurations having parallelly disposed edges to form an engageable strap, and means for feeding cards one at a time from said stack regardless of possible warped conditions of said cards, comprising floating throats and flexible card hooks, each of said throats having an opening greater than the thickness of one card and less than the thickness of two cards, slotted means for mounting said throats adjacent said card receptacle to permit vertical movement of said throats, an arm carried by each of said throats resting on the top card of said stack to determine the position of said throats by the position of the top card in said stack, means for holding a large part of said card stack out of contact with said throats, means for advancing a plurality of cards near the top of said stack into contact with said throats, a flexible drive medium comprising an endless chain for moving said card hooks over said stack of cards in a direction parallel to the surface thereof, means for mounting said card hooks on predetermined links of said chain, prongs projecting from said card hooks a distance less than the thickness of one card and arranged to engage said strap, and bifurcated spring means in said mounting yieldable both vertically and angularly for pressing said prongs against the top card in said stack until said prongs engage said strap.

13. In a card perforator, a card receptacle, a stack of cards in said receptacle, each card having preformed configurations therein, adjacent configurations having parallelly disposed edges to form an engageable strap, and means for feeding cards from said stack regardless of possible warped conditions of said cards comprising floating throats and flexible card hooks, means for determining the position of said throats by the position of the top card in said stack, means for holding a large part of said card stack out of contact with said throats, means for advancing a plurality of cards near the top of said stack into contact with said throats, drive means comprising an endless chain for moving said card hooks over said stack of cards in a direction parallel to the surfaces thereof, means for mounting said card hooks on predetermined links of said chain, prongs projecting from said card hooks arranged to engage said strap, spring means in said mounting for pressing said prongs against the top card in said stack until said prongs engage said strap and means for exerting upward pressure on said stack, the shape of said card configurations permitting said pressure to act on said card hook only through the medium of said top card.

14. In a card perforator, a card receptacle, a stack of cards in said receptacle, each card having preformed configurations therein, adjacent configurations having parallelly disposed edges to form an engageable strap, and means for feeding cards one at a time from said stack regardless of possible warped conditions of said cards, comprising floating throats and flexible card hooks, each of said throats having an opening greater than the thickness of one card and less than the thickness of two cards, slotted means for mounting said throats adjacent said card receptacle to permit vertical movement of said throats, an arm carried by each of said throats resting on the top card of said stack to determine the position of said throats by the position of the top card in said stack, means for holding a large part of said card stack out of contact with said throats, means for advancing a plurality of cards near the top of said stack into contact with said throats, a flexible drive medium comprising an endless chain for moving said card hooks only in one direction over said stack of cards, means for mounting said card hooks on predetermined links of said chain, prongs projecting from said card hooks a distance less than the thickness of one card and arranged to engage said strap, bifurcated spring means in said mounting yieldable both vertically and angularly for pressing said prongs against the top card in said stack until said prongs engage said strap, and means for exerting upward pressure on said stack, the shape of said card configurations preventing said pressure transmitted through said stack from acting on said card hooks to disengage said card hook from said top card.

15. In a card perforator, a card receptacle, a stack of cards in said receptacle, each card having indentations and perforations therein so related as to provide a plurality of straps within the outline of the card, and means for feeding cards one at a time from said stack regardless of possible warped conditions of said cards, comprising a pair of floating throats and flexibly mounted card hooks, each of said throats having an opening greater than the thickness of one card and less than the thickness of two cards, slotted means mounted adjacent said card receptacle, studs on said throats movable in said slots to permit vertical movement of said throats, an arm carried by each of said throats resting on the top card of said stack to hold the openings in said throats opposite said top card, a pair of endless chains for simultaneously moving a pair of said card hooks in the same direction over said stack of cards, means for mounting said hooks on predetermined links of said chain, prongs projecting in opposite directions from said card hooks a distance less than the thickness of one card and aligned to engage the two edges of said card straps, bifurcated springs so attached to said predetermined links as to be yieldable both vertically and angularly and acting on said card hooks for pressing said prongs against the top card in said stack until said prongs engage said card straps, and means for exerting upward pressure on said stack, the indentation in said card permitting said upward pressure to act on said card hooks only through the medium of said top card.

16. In a card perforator, a card receptacle, a stack of cards in said receptacle, each card having indentations and perforations therein so related as to provide a plurality of straps within the outline of the card, and means for feeding cards one at a time from said stack regardless of possible warped conditions of said cards, comprising a pair of floating throats and flexibly mounted card hooks, each of said throats having an opening greater than the thickness of one card and less than the thickness of two cards, slotted means mounted adjacent said card receptacle, studs on said throats movable in said slots to permit vertical movement of said throats, an arm carried by each of said throats resting on the top card of said stack to hold the openings in said throats opposite said top card, a pair of endless chains for simultaneously moving a pair of said card hooks in the same direction over said stack of cards, means for mounting said hooks on predetermined links of said chain, prongs projecting in opposite directions from said card hooks a distance less than the thickness of one card and aligned to engage the two edges of said card straps, bifurcated springs so attached to said predetermined links as to be yieldable both vertically and angularly and acting on said card hooks for pressing said prongs against the top card in said stack until said prongs engage said card straps, and means for exerting upward pressure on said stack, the indentation in said card preventing the pressure exerted through said stack from acting on said card hooks to disengage said card hooks from said top card as said card leaves said stack.

LEON N. HAMPTON.
MARTIN SALZER.

References Cited in the file of this patent

UNITED STATES PATENTS

| Number | Name | Date |
|---|---|---|
| 652,821 | Vail et al. | July 3, 1900 |
| 679,961 | French | Aug. 6, 1901 |
| 1,033,951 | Sargent | July 30, 1912 |
| 1,352,308 | Murray | Sept. 7, 1920 |
| 1,883,984 | Lasker | Oct. 25, 1932 |
| 1,976,352 | Maul | Oct. 9, 1934 |
| 2,359,680 | Roth | Oct. 3, 1944 |
| 2,375,296 | Ford | May 8, 1945 |